(12) United States Patent
Berkey et al.

(10) Patent No.: US 7,339,721 B1
(45) Date of Patent: Mar. 4, 2008

(54) OPTICAL FIBER LIGHT SOURCE BASED ON THIRD-HARMONIC GENERATION

(75) Inventors: George Edward Berkey, Pine City, NY (US); Ming-Jun Li, Horseheads, NY (US); Shenping Li, Painted Post, NY (US); Daniel Aloysius Nolan, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 11/712,159

(22) Filed: Feb. 28, 2007

(51) Int. Cl.
*G02F 2/02* (2006.01)
*G02B 6/036* (2006.01)

(52) U.S. Cl. .................. 359/329; 385/126; 372/22
(58) Field of Classification Search ........ 359/326–332; 385/123, 126; 372/6, 22
See application file for complete search history.

(56) References Cited

U.S. PATENT DOCUMENTS 5,106,176 A * 4/1992 Poumellec et al. ......... 359/329
2007/0274651 A1 * 11/2007 DiGiovanni et al. ........ 385/124

OTHER PUBLICATIONS

A. Efimov et al, "Phase-matched third harmonic generation in microstructured fibers", Optics Express, vol. 11, No. 20, Oct. 6, 2003, pp. 2567-2576.

V. Grubsky, "Glass micro-fibers for efficient third harmonic generation", Optic Express, vol. 13, No. 18, Sep. 5, 2005, pp. 6798-6806.

D. L. Nicácio, et al, "Third-harmonic generation in $GeO_2$ doped silica single-mode optical fibers", Applied Physics Letters 62 (18), May 3, 1993, pp. 2179-2181.

J. Thøgersen et al, "Third harmonic generation in standard and erbium-doped fibers", Optics Communications 110 (1994), pp. 435-444.

* cited by examiner

*Primary Examiner*—Hemang Sanghavi
(74) *Attorney, Agent, or Firm*—Robert L. Carlson

(57) ABSTRACT

An optical-fiber-based light source that generates light via third-harmonic (TH) generation is disclosed. The light source includes a pump light source that provides pump light having a fundamental mode of wavelength $\lambda_P$. The light source also includes an optical fiber optically coupled to the pump light source. The optical fiber's core refractive index profile has (i) a central region with a refractive index value $\Delta_1$, (ii) a first annular region immediately surrounding the central region and having a refractive index value $\Delta_2$, and (iii) a second annular region immediately surrounding the first annular region and having a refractive index value $\Delta_3$. The optical fiber satisfies the conditions $\Delta_2<\Delta_1$ and $\Delta_2<\Delta_3$, and $\max\{\Delta_1,\Delta_3\}-\Delta_2>1.2\%$. The pump light produces TH-generated light having a higher-order mode of wavelength $\lambda_{TH}=(1/3)\lambda_P$ and that is outputted at the optical fiber output end. The pump light fundamental mode overlaps the TH-generated-light higher order mode over the length of the optical fiber to provide a conversion efficiency of 1% or greater.

21 Claims, 8 Drawing Sheets

OPTICAL FIBER LIGHT SOURCE BASED ON THIRD-HARMONIC GENERATION

BACKGROUND OF THE INVENTION

1. Field of the Invention

The present invention relates generally to non-linear optical fibers and light sources, and particularly to a light source based on efficiently producing light via third-harmonic generation in an optical fiber.

2. Technical Background

Non-linear optical materials have the property that the electric polarization responds non-linearly to an incident optical field. The non-linearity of an optical material is typically expressed as a power series expansion of the total applied optical field, with susceptibility coefficients $\chi^{(1)}$, $\chi^{(2)}$ and $\chi^{(3)}$ representing the linear and non-linear second-order and third-order susceptibilities, respectively.

Third-order harmonic (TH) generation of light (simply called "TH generation") is a nonlinear optical process that exploits the third-order susceptibility $\chi^{(3)}$ of an optical material to generate light with triple the frequency of the incident (pump) light. In many materials, the third-order non-linear susceptibility, however, is typically orders of magnitude smaller than the second-order susceptibility, so that corresponding third-order effects have much smaller conversion efficiencies relative to second-order effects (e.g., second-harmonic generation of light).

While direct TH generation is theoretically possible in a number of different materials, light sources based on direct TH generation have very low conversion efficiencies and so are generally not used in practice. Presently, virtually all frequency-tripling applications avoid direct TH-generation in a single medium, and use a two-stage process of second-harmonic generation in a first non-linear crystal with a strong $\chi^{(2)}$ coefficient, followed by frequency summing in a second non-linear crystal with a strong $\chi^{(2)}$ coefficient.

For direct TH generation to be useful in practice, a conversion efficiency of 1% or greater is needed. However, when the fundamental (pump) wave travels through the material at a different velocity than does the resulting harmonic wave due to the normal dispersion of the optical material, the proper phase between the fundamental and harmonic waves is not maintained. The result is that the third-harmonic waves and the pump wave destructively interfere, resulting in poor conversion efficiency. Accordingly, one technique used to increase the conversion efficiency in non-linear optical processes is called "phase-matching." Phase-matching involves maintaining the proper phase between the pump and harmonic wave so that the harmonic waves and the pump wave constructively interfere.

TH generation is possible in optical fibers. The third-order susceptibility coefficient $\chi^{(3)}$ is generally stronger than the second-order susceptibility $\chi^{(2)}$ in optical fibers due to the lack of crystal symmetry of the fiber. However, the glass material dispersion property of optical fibers prevents phase matching between the fundamental modes of the pump light and the TH-generated light. Further, the overlap between the pump and harmonic optical fields in conventional optical fibers is typically very small, making the conversion efficiency so low (<1%) as to be useless for commercial applications. The practical effect of this shortcoming is that there is no robust commercial light source based on direct TH generation that can be used to generate light that can be used for a variety of applications ranging from medical treatment to materials processing to laser projection displays.

Microstructured fibers have been proposed for TH generation in guided modes, but the conversion efficiency is well below 1%. Glass micro-fibers have also been proposed for TH generation. However, while good efficiency is theoretically possible, it is very hard in practice to make microstructured fibers with sub-wavelength diameter. Further, it is very difficult to optically couple to such small fibers.

Accordingly, what is needed is an optical-fiber-based light source that uses direct TH-generation at sufficiently high conversion efficiencies so that the light source can be used for commercial applications.

SUMMARY OF THE INVENTION

One aspect of the invention is an optical-fiber-based light source (a "TH light source") that generates light via third-harmonic (TH) generation. The TH light source includes a pump light source that provides pump light having a fundamental mode of wavelength $\lambda_P$. The TH light source also includes an optical fiber having an input end, an output end, a length L, and a core formed about a centerline and having a refractive index profile ($\Delta(\%)$), wherein the optical fiber is optically coupled to the pump light source at its input end. The core refractive index profile has (i) a central region centered on the center line and having a refractive index value $\Delta_1$ and an outer radius $r_1$, (ii) a first annular region immediately surrounding the central region and having a refractive index value $\Delta_2$ and an inner and outer radii of $r_1$ and $r_2$, respectively, and (iii) a second annular region immediately surrounding the first annular region and having a refractive index value $\Delta_3$ and an inner and outer radii of $r_2$ and $r_3$, respectively. The refractive index profile also satisfies the conditions $\Delta_2 < \Delta_1$ and $\Delta_2 < \Delta_3$, and wherein $\max\{\Delta_1, \Delta_3\} - \Delta_2 > 1.2\%$. The pump light produces the TH-generated light having a higher-order mode of wavelength $\lambda_{TH} = (1/3)\lambda_P$. The TH-generated light is outputted at the optical fiber output end. The pump light fundamental mode overlaps the TH-generated-light higher order mode over the optical fiber length L so as to provide a conversion efficiency of pump light to TH-generated light of 1% or greater.

Another aspect of the present invention is a method of producing, with high conversion efficiency, third-harmonic generation light using an optical fiber. The method includes providing the optical fiber, wherein the optical fiber has an input end, an output end, a length L, and a core formed about a centerline and having a refractive index profile ($\Delta(\%)$), with (i) a central region centered on the center line and having a refractive index value $\Delta_1$ and an outer radius $r_1$, (ii) a first annular region immediately surrounding the central region and having a refractive index value $\Delta_2$ and an inner and outer radii of $r_1$ and $r_2$, respectively, and (iii) a second annular region immediately surrounding the first annular region and having a refractive index value $\Delta_3$ and an inner and outer radii of $r_2$ and $r_3$, respectively, and wherein $\Delta_2 < \Delta_1$ and $\Delta_2 < \Delta_3$, and wherein $\max\{\Delta_1, \Delta_3\} - \Delta_2 > 1.2\%$. The method also includes introducing pump light having a fundamental mode of wavelength of $\lambda_P$ into the optical fiber so as to produce TH-generated light having a higher-order mode of wavelength $\lambda_{TH} = (1/3)\lambda_P$ that is outputted at the optical fiber output end, including causing the pump light fundamental mode to overlap the TH-generated-light higher order mode over the length L to provide a conversion efficiency of pump light to TH-generated light of 1% or greater.

Another aspect of the present invention is an optical transmission system that includes a transmitter that includes the TH light source as described briefly above and described in greater detail hereinbelow. The system also includes a receiver adapted to receive optical signals formed from the TH-generated light. The system further includes an optical fiber link that connects the transmitter and receiver and that is adapted to carry the optical signals.

Another aspect of the invention is an optical processing system that includes at least one TH light source of the type described briefly above and described in greater detail hereinbelow. The system also includes conditioning optics optically coupled to the at least one TH light source and adapted to condition the TH-generated light from the at least one TH light source.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operations of the invention.

DETAILED DESCRIPTION OF THE PREFERRED EMBODIMENTS

Figure 1:
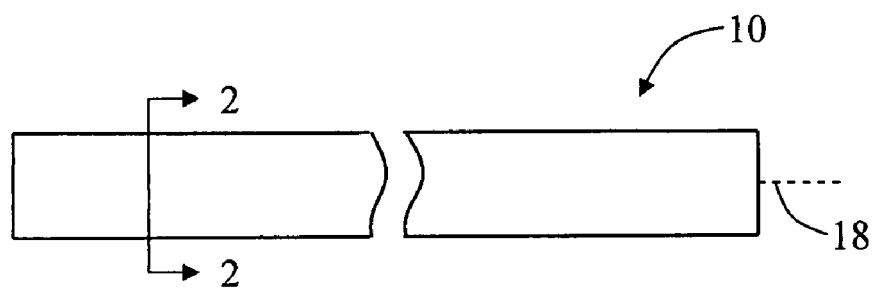
FIG. 1 is a schematic side view of an optical fiber suitable for use in the TH light source of the present invention.

Reference will now be made in detail to the present preferred embodiments of the invention, examples of which are illustrated in the accompanying drawings. Whenever possible, the same reference numbers and symbols are used throughout the drawings to refer to the same or like parts.

In the discussion below, the "refractive index profile" is the relationship between refractive index or relative refractive index and waveguide fiber radius. The "relative refractive index percent" is defined as $\Delta(\%)=[(n_i^2-n_c^2)/2n_i^2]\times 100$, where $n_i$ is the maximum refractive index in region i, unless otherwise specified, and $n_c$ is the average refractive index of the cladding region, as discussed below. As used herein, the relative refractive index percent is represented by $\Delta(\%)$ (or just $\Delta$) and its values are given in units of "%", unless otherwise specified. The relative refractive index of select regions 1, 2 and 3 is abbreviated as $\Delta_1$, $\Delta_2$ and $\Delta_3$, respectively. In cases where the refractive index of a region is less than the average refractive index of the cladding region, the relative index percent is negative and is referred to as having a "depressed region" or a "depressed index," and is calculated at the point at which the relative index is most negative unless otherwise specified. In cases where the refractive index of a region is greater than the average refractive index of the cladding region, the relative index percent is positive and the region can be said to be raised or to have a positive index. An "updopant" is herein considered to be a dopant which has a propensity to raise the refractive index relative to pure undoped $SiO_2$. A "downdopant" is herein considered to be a dopant which has a propensity to lower the refractive index relative to pure undoped $SiO_2$. An updopant may be present in a region of an optical fiber having a negative relative refractive index when accompanied by one or more other dopants which are not updopants. Likewise, one or more other dopants which are not updopants may be present in a region of an optical fiber having a positive relative refractive index. A downdopant may be present in a region of an optical fiber having a positive relative refractive index when accompanied by one or more other dopants which are not downdopants. Likewise, one or more other dopants which are not downdopants may be present in a region of an optical fiber having a negative relative refractive index.

In the discussion below, optical fibers suitable for use in the TH light source of the present invention are first discussed, followed by a general description of the TH light source of the present invention. The mathematical basis for the relative refractive index profile of the optical fibers used in the TH light source is then discussed. Example embodiments of relative refractive index profiles for the optical fibers used in the TH light source are then set forth. Finally, an optical communication system that uses the TH light source of the present invention is described.

Optical Fiber for TH Light Source

Figure 2:
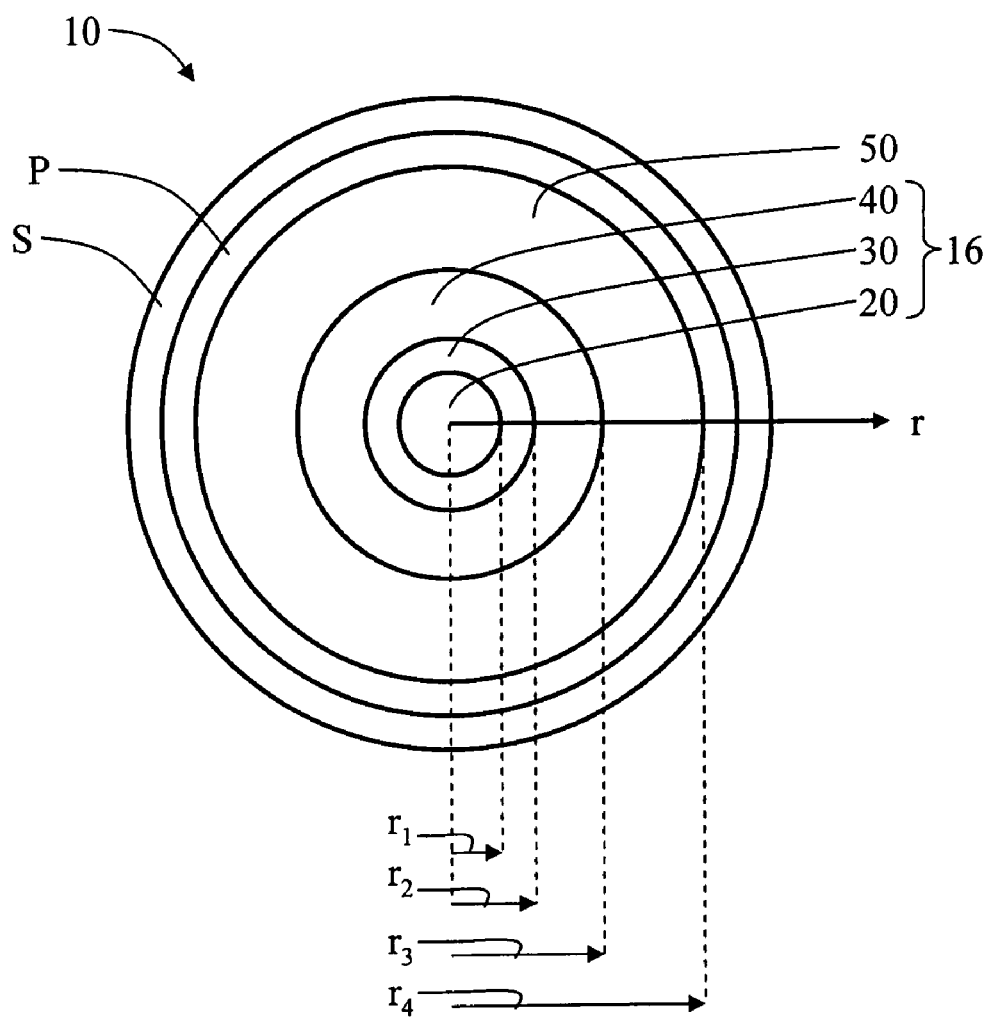
FIG. 2 is a schematic cross-sectional view of the optical fiber of FIG. 1 taken along the line 2-2, illustrating the different regions of the optical fiber of FIG. 1 associated with the generalized refractive index profile that allows the optical fiber to be used as an efficient source of light via third-harmonic generation.

FIG. 1 is a schematic side view of an optical fiber 10 suitable for use in the TH light source of the present invention, as discussed below. FIG. 2 is a cross-sectional view of the optical fiber as taken along the line 2-2 in FIG. 1. FIG. 2 illustrates the generalized structure (i.e., refractive index profile) of optical fiber 10 that allows for efficient TH generation as part of the TH light source. In an example embodiment, optical fiber 10 is a step-index type of optical fiber and has a core 16 having a centerline 18. Core 16 includes three different regions or segments—namely, a central core region 20 of refractive index $n_1$ (i.e., $n_i$ with $i=1$) and an outer radius $r_1$ surrounded by a first annular core region 30 having a refractive index $n_2$, an inner radius $r_1$ and an outer radius $r_2$, which in turn is surrounded by second annular core region 40 having a refractive index $n_3$, an inner radius $r_2$ and an outer radius $r_3$. Radius $r_3$ thus represents the outer radius of core 16.

In an example embodiment, core 16 is comprised of doped silica, wherein the central core region 20 is comprised of silica doped with germanium, i.e. germania doped silica. Dopants other than germanium, singly or in combination, may be employed within core 16, and particularly at or near the centerline, of the optical fiber disclosed herein to obtain the desired relative refractive index profiles as discussed below. In preferred embodiments of present invention, core 16 of the optical fiber disclosed herein has a non-negative refractive index profile, i.e., is non-negative from the centerline to the outer radius of the core $r_3$, more preferably a positive refractive index profile, wherein the core is surrounded by and directly adjacent to a cladding layer. In some preferred embodiments, the optical fiber contains no index-decreasing dopants in the core. In other preferred embodiments, the optical fiber contains both one or more index-increasing dopants and one or more index-decreasing dopants in the core.

With continuing reference to FIG. 2, core 16 is surrounded by an annular cladding region ("cladding") 50 having a refractive index $n_c$, an inner radius $r_3$ and an outer radius $r_4$. In an example embodiment, cladding 50 contains no germania or fluorine dopants therein. In an example embodiment, cladding 50 is pure or substantially pure silica. In another example of embodiment, cladding 50 contains fluorine dopant. Cladding 50 may be comprised of a cladding material which was deposited, for example during a laydown process, or which was provided in the form of a jacketing, such as a tube in a rod-in-tube optical preform arrangement, or a combination of deposited material and a jacket. Cladding 50 may include one or more dopants. In an example embodiment, cladding 50 is surrounded by a primary coating P and a secondary coating S that surrounds the primary coating.

The refractive index $n_c$ of cladding 50 is used to calculate the relative refractive index percentage $\Delta(\%)$. Since cladding 50 has a refractive index $n_c$, the relative refractive index percentage of the cladding at a cladding radius $r_c$ (where $r_c > r_3$) is given by $\Delta(r_c)=0\%$. In an example embodiment, cladding 50 is immediately surrounded by a primary coating P and a secondary coating S that immediately surrounds the primary coating.

Figure 3:
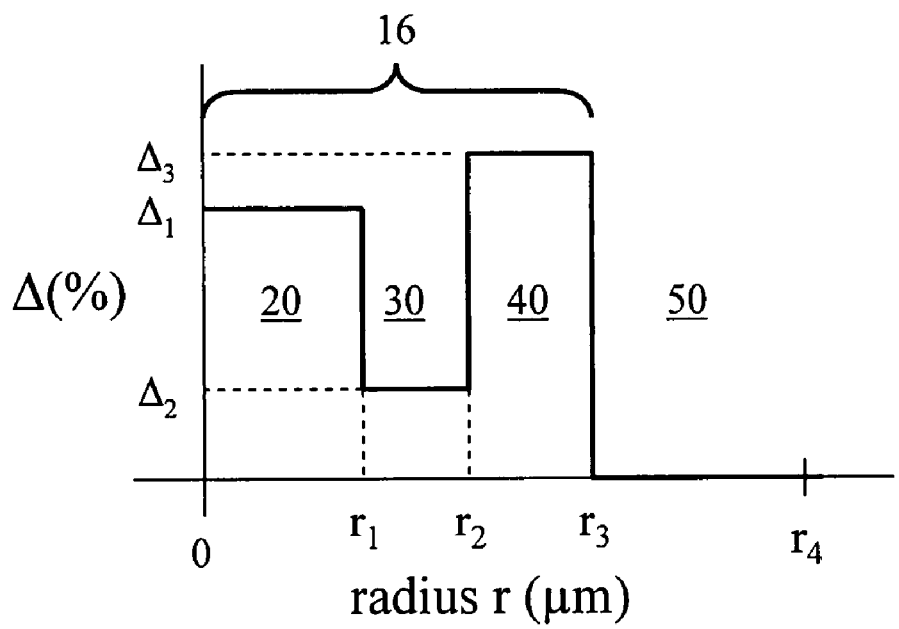
FIG. 3 is a plot of the idealized relative refractive index profile $\Delta(\%)$ as a function of optical fiber radius r ($\mu$m) associated with the optical fiber structure illustrated in the cross-section of FIG. 2.

FIG. 3 is a plot of an idealized relative refractive index profile $\Delta(\%)$ as a function of optical fiber radius r (μm) associated with non-linear optical fiber 10 according to the present invention as illustrated in the cross-section of FIG. 2. From FIG. 3, it is seen that first annular core region 30 has a relative refractive index $\Delta_2$ that represents a "dip" in the overall relative refractive index profile $\Delta(\%)$ of optical fiber 10, i.e., $\Delta_2<\Delta_1$ and $\Delta_2<\Delta_3$. Also, relative refractive indices $\Delta_1$ and $\Delta_3$ respectively associated with central core region 20 and second annular core region 40 can either be equal or have different values. The maximum value of the relative refractive index for core 16 is thus either $\Delta_1$ or $\Delta_3$, and is given by max$\{\Delta_1, \Delta_3\}$.

In an example embodiment, optical fiber 10 has the property that max $\{\Delta_1, \Delta_3\}-\Delta_2>1.2\%$, and more preferably, max$\{\Delta_1, \Delta_3\}-\Delta_2>1.5\%$. Also in an example embodiment, optical fiber 10 has the property that $\Delta_1, \Delta_3>1.5\%$, and more preferably, $\Delta_1, \Delta_3>2.5\%$. Further, in an example embodiment, radius $r_1$ of central core region 20 has the property that $0.5 \mu m \leq r_1 \leq 1$ μm. Moreover, in an example embodiment, optical fiber 10 has the property that $1.5 \leq r_2/r_1 \leq 3.5$. In another example embodiment, optical fiber 10 has the property that $2.5 \leq r_3/r_1 \leq 7$. In an example embodiment, optical fiber 10 has one or more of the above-identified properties (to the extent they are mutually consistent).

Figure 4:
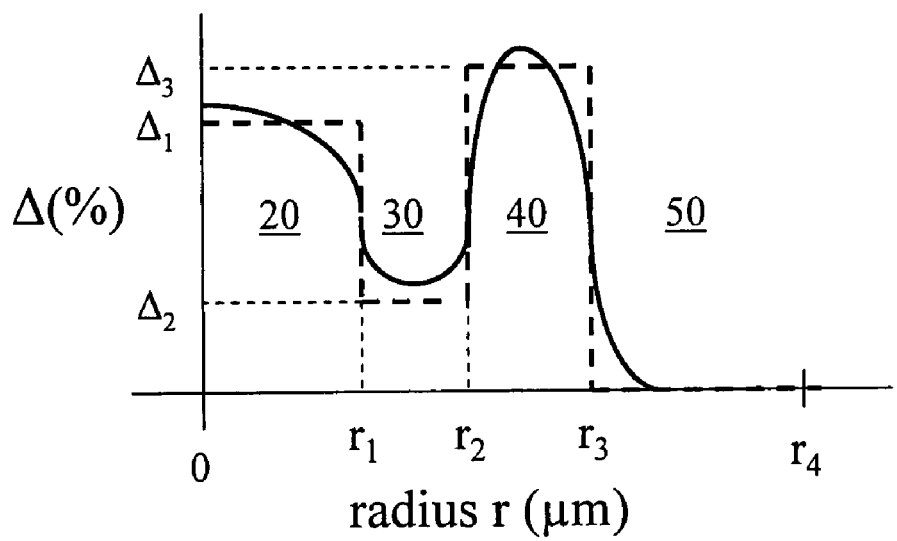
FIG. 4 is a plot similar to FIG. 3, but showing the rounded profile that occurs in practice when making the optical fiber.

FIG. 4 is a relative refractive index profile plot similar to the idealized plot of FIG. 3, illustrating an example of the more rounded refractive index profile that occurs in practice. The associated idealized profile is shown as a bold dashed line.

In an example embodiment, the different embodiments of optical fiber 10 disclosed herein are made by a vapor deposition process. Even more preferably, the different embodiments of optical fiber 10 are made by an outside vapor deposition (OVD) process. Thus, for example, known OVD laydown, consolidation, and draw techniques may be advantageously used to produce the optical waveguide fiber disclosed herein. Other processes, such as modified chemical vapor deposition (MCVD) or vapor axial deposition (VAD) or plasma chemical vapor deposition (PCVD) may be used, either alone or in combination with any other deposition process. Thus, the refractive indices and the cross sectional profile of the optical waveguide fibers disclosed herein can be accomplished using manufacturing techniques known to those skilled in the art including, but in no way limited to, OVD, VAD and MCVD processes.

TH Light Source

Figure 5:
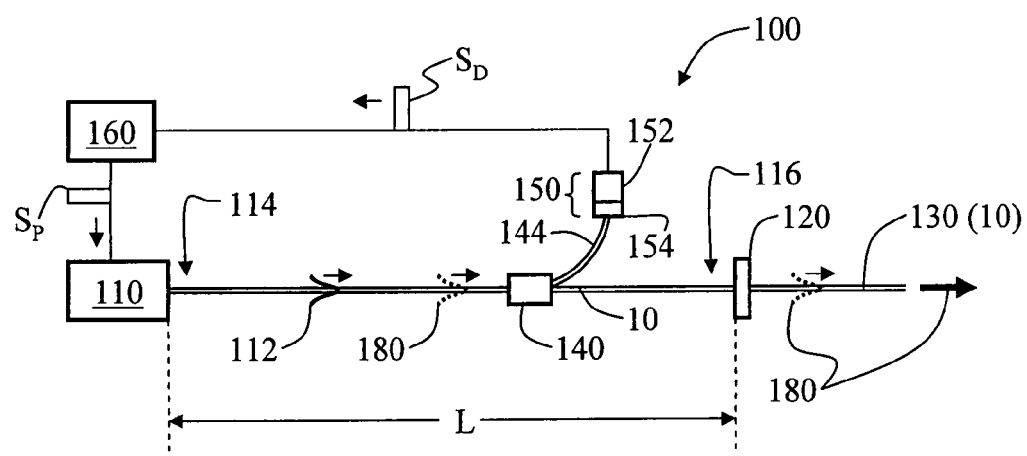
FIG. 5 is a schematic diagram of an example embodiment of the light source of the present invention that uses the optical fiber of FIG. 1 through FIG. 4.
Figure 6:
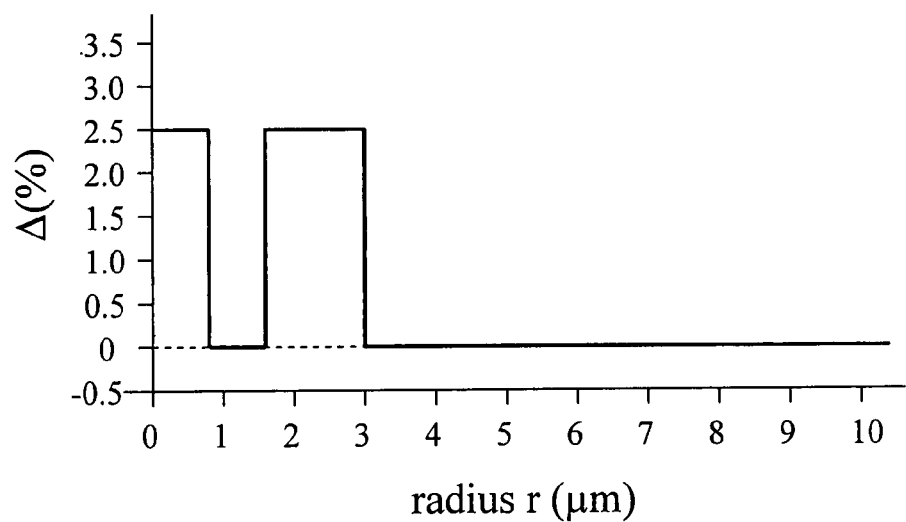
FIG. 6 is a plot of a first example embodiment of a relative refractive index profile consistent with the generalized relative refractive index profile of FIG. 3.
Figure 7:
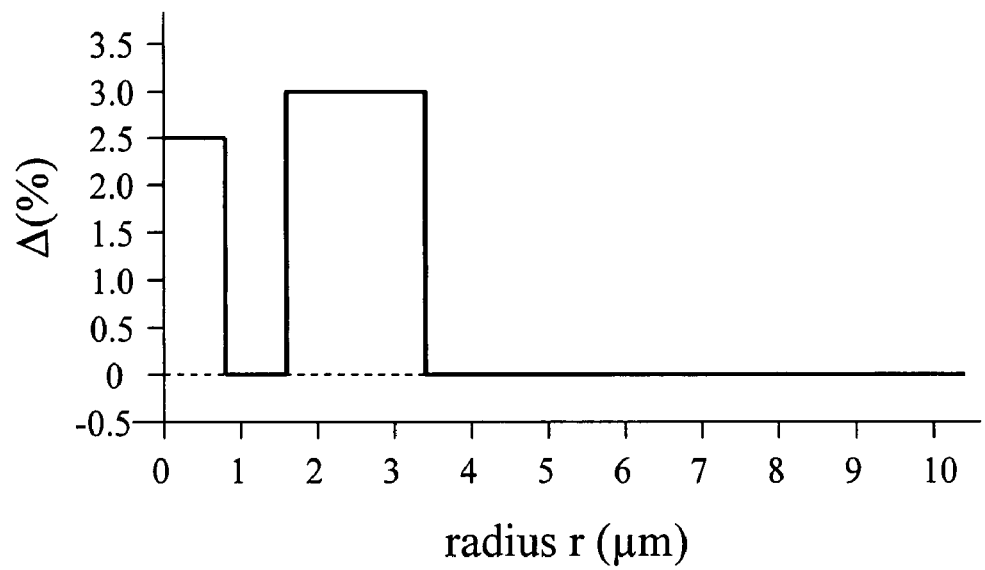
FIG. 7 is a plot of a second example embodiment of a relative refractive index profile consistent with the generalized relative refractive index profile of FIG. 3.
Figure 8:
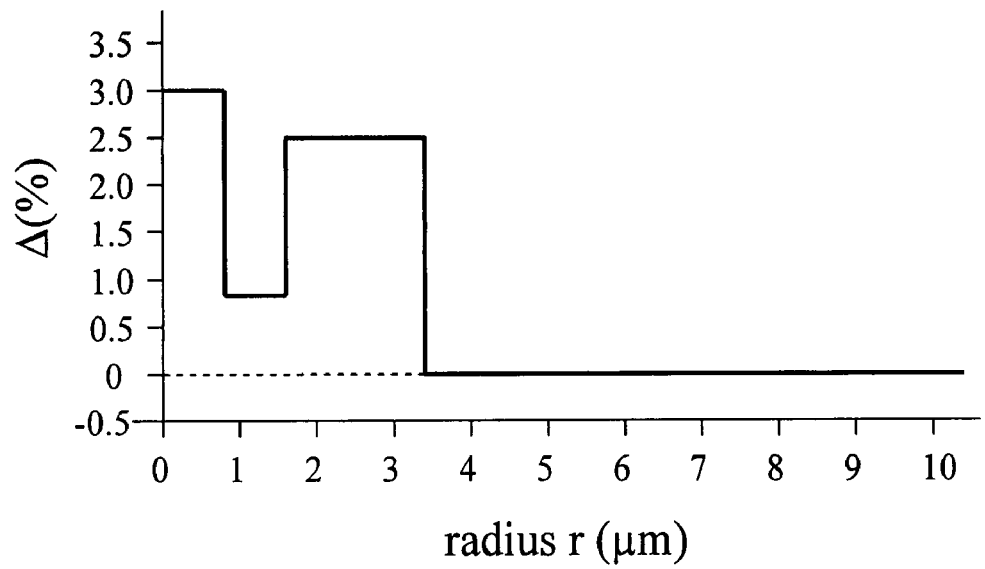
FIG. 8 is a plot of a third example embodiment of a relative refractive index profile consistent with the generalized relative refractive index profile of FIG. 3.
Figure 9:
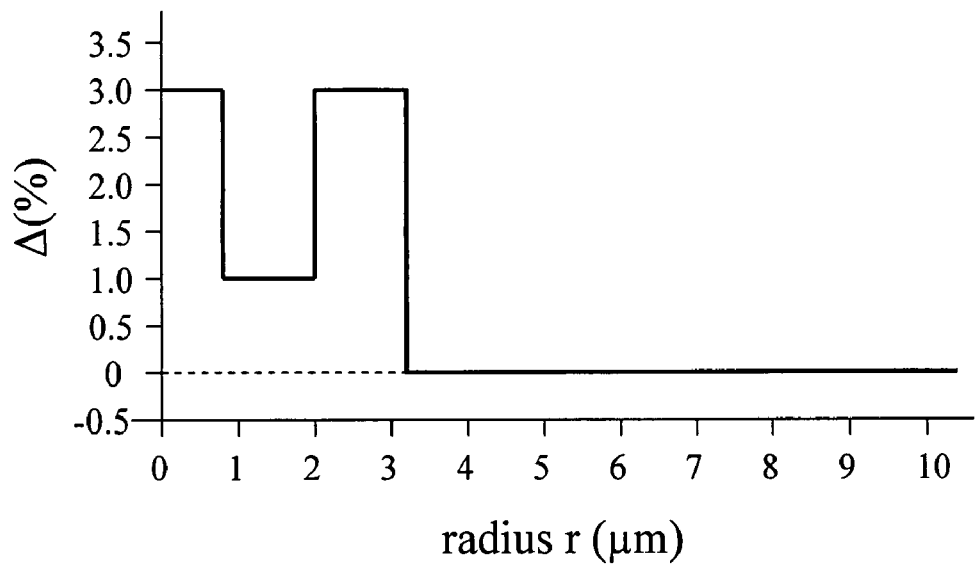
FIG. 9 is a plot of a fourth example embodiment of a relative refractive index profile consistent with the generalized relative refractive index profile of FIG. 3.

FIG. 5 is a schematic diagram of an example embodiment of a TH light source 100 according to the present invention. TH light source 100 includes a pump light source 110 adapted to generate pump light 112 having a wavelength $\lambda_P$. In an example embodiment, pump light source 110 is or includes a single-wavelength laser source that results in the creation of corresponding single-wavelength TH-generated light 180 of wavelength $\lambda_{TH}=\lambda_P/3$. The generation of TH-generated light 180 is discussed in detail below. In an example embodiment, pump light source 112 is or includes or a tunable laser source that can result in the generation of TH-generated light of different wavelengths that depend on the pump light wavelength. Example pump light sources include semiconductor lasers and fiber lasers such as Er-doped fiber lasers and Yb-doped fiber lasers. Pump light sources can be continue-wave laser sources or pulse laser sources. Besides laser sources, the pump light source may also include one stage or one more stages of optical amplifiers to further amplify the intensity of the laser output and thus the pump light.

TH light source 100 also includes a section of optical fiber 10 having a length L, an input end 114 and an output end 116. Length L is such that a high conversion efficiency can be achieved, and in example embodiments is ~1 meters, ~50 meters, ~100 meters, or more. Example lengths L are discussed below in connection with the conversion efficiency of the TH light source. In an example embodiment, 1 m<L<60 m.

Optical fiber input end 112 is optically coupled to pump light source 110 using any one of a number of available optical coupling methods known in the art. In an example embodiment, an optical filter 120 is arranged at or near output end 116. Optical filter 120 adapted to filter out unconverted pump-light of wavelength $\lambda_P$ (and optionally other wavelengths) and pass TH-generated light 180 of wavelength $\lambda_{TH}=\lambda_P/3$. In an example embodiment, an external optical fiber 130 is optically coupled to optical fiber 10, e.g., at filter 120. In an example embodiment, optical fiber 130 is another section of optical fiber 10.

In an example embodiment, TH light source 100 further includes an optical tap 140 arranged along optical fiber 10 and adapted to tap a portion of TH-generated light 180 traveling down the optical fiber. A tap optical fiber 144 is optically coupled at one end to optical tap 140 and at its other end to a photodetector unit 150. Photodetector unit 150 is adapted to receive and detect tapped TH-generated light traveling in tap optical fiber 144. In an example embodiment where only TH-frequency light is to be detected by photodetector unit 150, the photodetector unit includes a photodetector 152 with an optical filter 154 arranged in front of the photodetector to filter out frequencies other than the TH-frequency $f_{TH}$. In an example embodiment, optical filter 154 is the same type of filter as optical filter 120. In another example embodiment, optical tap 140 is arranged downstream of first optical filter 120 in external optical fiber 130 so that optical filter 154 is not necessary.

TH light source 100 also includes a controller 160 operably coupled to pump light source 110 and to photodetector unit 150. Controller 160 is or includes a microprocessor adapted to control the operation of TH light source 100, as described immediately below.

In the operation of TH light source 100, controller 160 provides an activation signal $S_P$ to pump light source 100 that controls the wavelength of the pump light in order to optimize the TH conversion efficiency and causes the pump light source to generate a given amount of pump light 112. Pump light 112 is coupled into optical fiber 10 and propagates down the optical fiber as a guided wave having a fundamental mode.

Pump light 112 causes optical fiber 10 to produce TH-generated light 180. Because of the specialized properties of optical fiber 10 as described above, there is good overlap between the pump light fundamental mode and one of the higher-order modes (e.g., the $LP_{04}$ mode) of the TH-generated light 180, as described in greater detail below. The result is that TH-generated light 180 is generated over length L of optical fiber 10 with a relatively high conversion efficiency. In an example embodiment, the conversion efficiency is greater than 1%, in another example embodiment is preferably greater than 5%, and in another example embodiment is preferably greater than 15%. The conversion efficiency of the TH light source of the present invention can be has high as its corresponding theoretical maximum conversion efficiency, which can range anywhere from about 30% up to about to about 70%, though a maximum conversion efficiency of 60% is a more likely achievable maximum.

TH-generated light 180 exits optical fiber 10 at end 114. The optional optical filter 120 located at or near end 114 serves to ensure that any unconverted pump light 112 (or other light present in optical fiber 10 other than the TH-generated light) is blocked so that the output of TH light source 100 only includes TH-generated light 180.

Meanwhile, a small amount of TH-generated light 180 is tapped from optical fiber 10 at optical tap 140 and is detected by detector unit 150. In one example embodiment, filter 154 provided in front of photodetector 152 serves to block any pump light 112 tapped at optical tap 140. Photodetector 152 detects the TH-generated light 180 incident thereon generates in response a detector signal $S_D$ representative of the amount of TH-generated light detected. Detector signal $S_D$ is then provided to controller 160. Controller 160 is adapted to receive and process detector signal $S_D$ to assess the amount of TH-generated light 180 generated for the given amount of pump light 112 provided to optical fiber 10. Controller 160 can adjust the wavelength $\lambda_P$ and/or the amount of pump light 112 produced by pump light source 110 to optimize the conversion efficiency of the TH generation. The amount of pump light 112 can be adjusted up or down, depending on how much TH-generated light needs to be outputted by optical fiber 10 at output end 114.

Mathematical Basis for Optical-Fiber-Based TH Generation

The mathematical and physical bases for the generalized refractive index difference profile $\Delta(\%)$ of FIG. 3 for optical fiber 10 as it relates to efficient TH generation by TH light-source 100 is now described.

TH generation is a nonlinear process that generates light with triple the frequency (i.e., one-third of the wavelength) of the pump light (signal) from the pump light source. Under the assumption of small pump signal with no pump depletion, the third harmonic power $P_s$ generated by an optical fiber is expressed by the following equation:

$$P_s \approx P_p^3 (k_p n_2 f_{sppp})^2 \left(\frac{2}{\Delta\tilde{\beta}}\right) \sin^2\left(\frac{\Delta\tilde{\beta}}{2}z\right) \quad (1)$$

$$\Delta\tilde{\beta}=\Delta\beta+3k_p n_2(2f_{ppss}-f_{pppp})P_p \quad (2)$$

where $P_p$ is the pump power, $k_p$ is the wave number of the pump, $n_2$ is the nonlinear refractive index, $\Delta\tilde{\beta}$ is the phase mismatch factor including the linear phase mismatch $\Delta\beta$ due to effective index difference and nonlinear phase mismatch due to self and cross phase modulations, and $f_{ijkl}$ are the nonlinear overlap integral defined as:

$$f_{ijkl} = \frac{\int \psi_i \psi_j \psi_k \psi_l ds}{[\int \psi_i^2 ds]^{1/2}[\int \psi_j^2 ds]^{1/2}[\int \psi_k^2 ds]^{1/2}[\int \psi_l^2 ds]^{1/2}} \quad (3)$$

$$i, j, k, l = p\, or\, s$$

where $\psi_i$, (for i=p, s) are optical field of the pump (p) and harmonic (s), respectively.

Equations 1 and 2 indicate that two conditions must be satisfied to generate an efficient third harmonic wave in an optical fiber. The first condition is the phase matching condition, which requires that the effective index of the pump and harmonic light to be about equal. The second condition is a relatively large value for the overlap integral $f_{sppp}$ between the pump light and the harmonic light to ensure an efficient interaction.

Because of glass dispersion, the various refractive indices in the optical fiber are much higher at shorter wavelengths than at longer wavelengths. For example, the refractive index of pure silica is 1.4440 at 1550 nm wavelength, but 1.4614 at the third-harmonic wavelength of 517 nm. The relative index difference between these two wavelengths is 1.2%. A large refractive index change (difference) between the core and the cladding is needed to achieve the phase-matching condition. However, phase matching between the fundamental modes of the pump and the third harmonic is impossible. A higher order mode of the third harmonic must be used, which makes the overlap integrals between the pump and harmonic light very small.

For example, a simple step-index fiber is not suitable for third harmonic generation. In such an optical fiber, phase matching happens between the $LP_{01}$ mode of the pump and $LP_{04}$ mode of the harmonic. The overlap integral value of $f_{ppps}$ is only 0.005%, which is too small. For efficient TH generation, the overlap integral needs to be greater than 1%.

Annular Index Dip Region

An important feature of core 16 of optical fiber 10 is annular core region 30 that provides a dip in the refractive index profile $\Delta(\%)$ within core 16. This dip increases the optical power of the first $LP_{0n}$ mode, whose index is below the index of the dip in that region.

In an example embodiment, to achieve phase matching between the fundamental mode of the pump and the first $LP_{0n}$ mode of the harmonic whose index is below the index dip, the difference in $\Delta(\%)$ between the index dip region 30 and the peak index in core 16 is, as discussed above, preferably more than 1.2%, and more preferably greater than 1.5%. Also in an example embodiment, $\Delta_1(\%)$ and $\Delta_3(\%)$ are preferably greater than $\Delta_2(\%)$ by 1.5%, and more preferably greater by 2.5%. Also in an example embodiment, the radius $r_1$ of central core region 20 is between 0.5 to 1 μm. Also in an example embodiment, the ratio $r_2/r_1$ is preferably in the range from about 1.5 to about 3.5, and the ratio of $r_3/r_1$ is in the range from about 2.5 to about 7.

Refractive Index Profile Examples

Table 1 below sets forth 22 different example embodiments (examples) of relative refractive index profiles $\Delta(\%)$ based on the generalized refractive index profile of FIG. 3. The examples are numbered 1 through 22 under the first column "Ex". Table 1 provides various design parameters, including the five different overlap integrals $f_{ijkl}$. In the calculations associated with the examples of Table 1, the pump and harmonic wavelengths are assumed to be 1550 nm and 517 nm, respectively. For given index values of $\Delta_1$, $\Delta_2$ and $\Delta_3$, and ratios of $r_2/r_1$ and $r_3/r_1$, the radius $r_1$ is selected such that the effective refractive index of the pump mode and the effective index of harmonic mode are about equal. In all the examples, the pump mode is $LP_{01}$, and the harmonic mode is $LP_{04}$. With a high $\Delta$ such as 3% or more, the higher-order third-harmonic modes $LP_{03}$ or $LP_{02}$ can also be used for harmonic generation. However, high-$\Delta$ fibers are more difficult to make using conventional dopants.

TABLE 1

Refractive Index Profile Examples

| Ex | $\Delta_1$ | $\Delta_2$ | $\Delta_3$ | $r_1$ | $r_2$ | $r_3$ | $r_2/r_1$ | $r_3/r_1$ | $f_{ppps}$ | $f_{ppp}$ | $f_{ppss}$ | $f_{ssss}$ | $f_{psss}$ |
|---|---|---|---|---|---|---|---|---|---|---|---|---|---|
| 1 | 2.5 | 0.75 | 2.5 | 0.74 | 1.47 | 2.95 | 2.0 | 4.0 | −0.034 | 0.173 | 0.162 | 0.258 | −0.067 |
| 2 | 2.5 | 0.75 | 2.5 | 0.44 | 1.47 | 2.94 | 3.3 | 6.7 | −0.028 | 0.172 | 0.151 | 0.231 | −0.074 |
| 3 | 2.5 | 1 | 2.5 | 0.82 | 1.63 | 3.26 | 2.0 | 4.0 | −0.036 | 0.180 | 0.177 | 0.317 | −0.064 |
| 4 | 2.5 | 1 | 2.5 | 0.95 | 1.74 | 3.16 | 1.8 | 3.3 | −0.038 | 0.198 | 0.238 | 0.762 | 0.022 |
| 5 | 2.5 | 1 | 2.5 | 1.03 | 1.77 | 2.95 | 1.7 | 2.9 | −0.024 | 0.235 | 0.298 | 1.013 | 0.129 |
| 6 | 2.5 | 1 | 2.5 | 0.63 | 1.42 | 3.16 | 2.3 | 5.0 | −0.028 | 0.190 | 0.172 | 0.250 | −0.061 |
| 7 | 2.5 | 1.25 | 2.5 | 0.79 | 1.58 | 3.16 | 2.0 | 4.0 | −0.036 | 0.199 | 0.201 | 0.389 | −0.049 |
| 8 | 2.5 | 1.5 | 2.5 | 0.76 | 1.53 | 3.05 | 2.0 | 4.0 | −0.032 | 0.221 | 0.224 | 0.449 | −0.022 |
| 9 | 2.5 | 1.75 | 2.5 | 0.76 | 1.53 | 3.05 | 2.0 | 4.0 | −0.026 | 0.232 | 0.236 | 0.487 | 0.009 |
| 10 | 2.5 | 2 | 2.5 | 0.76 | 1.53 | 3.05 | 2.0 | 4.0 | −0.019 | 0.244 | 0.244 | 0.512 | 0.044 |
| 11 | 2.5 | 2.25 | 2.5 | 0.74 | 1.47 | 2.95 | 2.0 | 4.0 | −0.009 | 0.271 | 0.261 | 0.543 | 0.081 |
| 12 | 2.5 | 0.75 | 2.5 | 0.79 | 1.89 | 3.16 | 2.4 | 4.0 | −0.044 | 0.170 | 0.179 | 0.467 | −0.094 |
| 13 | 2.5 | 0.75 | 3 | 0.81 | 1.68 | 3.37 | 2.1 | 4.2 | −0.023 | 0.161 | 0.147 | 0.210 | −0.063 |
| 14 | 3 | 0.75 | 2.5 | 0.82 | 1.63 | 3.27 | 2.0 | 4.0 | −0.043 | 0.186 | 0.189 | 0.351 | −0.064 |
| 15 | 3 | 0.75 | 3 | 0.84 | 1.68 | 3.37 | 2.0 | 4.0 | −0.029 | 0.164 | 0.151 | 0.219 | −0.065 |
| 16 | 3 | 0.75 | 3 | 0.67 | 1.68 | 3.37 | 2.5 | 5.0 | −0.024 | 0.160 | 0.146 | 0.209 | −0.071 |
| 17 | 3 | 0.75 | 3 | 0.49 | 1.63 | 3.26 | 3.3 | 6.7 | −0.023 | 0.168 | 0.151 | 0.220 | −0.076 |
| 18 | 3 | 0.75 | 3 | 0.87 | 2.08 | 3.47 | 2.4 | 4.0 | −0.038 | 0.144 | 0.158 | 0.643 | −0.072 |
| 19 | 3 | 0.75 | 3 | 1.07 | 1.53 | 3.05 | 1.4 | 2.9 | −0.033 | 0.229 | 0.311 | 1.393 | 0.158 |
| 20 | 3 | 1 | 3 | 0.82 | 1.96 | 3.26 | 2.4 | 4.0 | −0.047 | 0.167 | 0.193 | 0.627 | −0.104 |
| 21 | 3 | 1.25 | 3 | 0.76 | 1.83 | 3.05 | 2.4 | 4.0 | −0.050 | 0.197 | 0.229 | 0.629 | −0.102 |
| 22 | 3 | 1.5 | 3 | 0.74 | 1.77 | 2.95 | 2.4 | 4.0 | −0.047 | 0.220 | 0.251 | 0.613 | −0.074 |

Table 1 shows that the absolute value of overlap integral $f_{ppps}$ is in the range of 1 to 5%, which is much higher than that for a simple step-index optical fiber. Refractive index profiles for Examples 1, 13, 14, and 21 are plotted in FIGS. 6 through 9, respectively.

For a given refractive index profile $\Delta(\%)$ according to the present invention, the phase matching condition can be fine tuned by two methods. One method involves changing the radius $r_3$ of core 16 by changing (scaling) the overall fiber diameter $d_F = 2r_4$.

Figure 10:
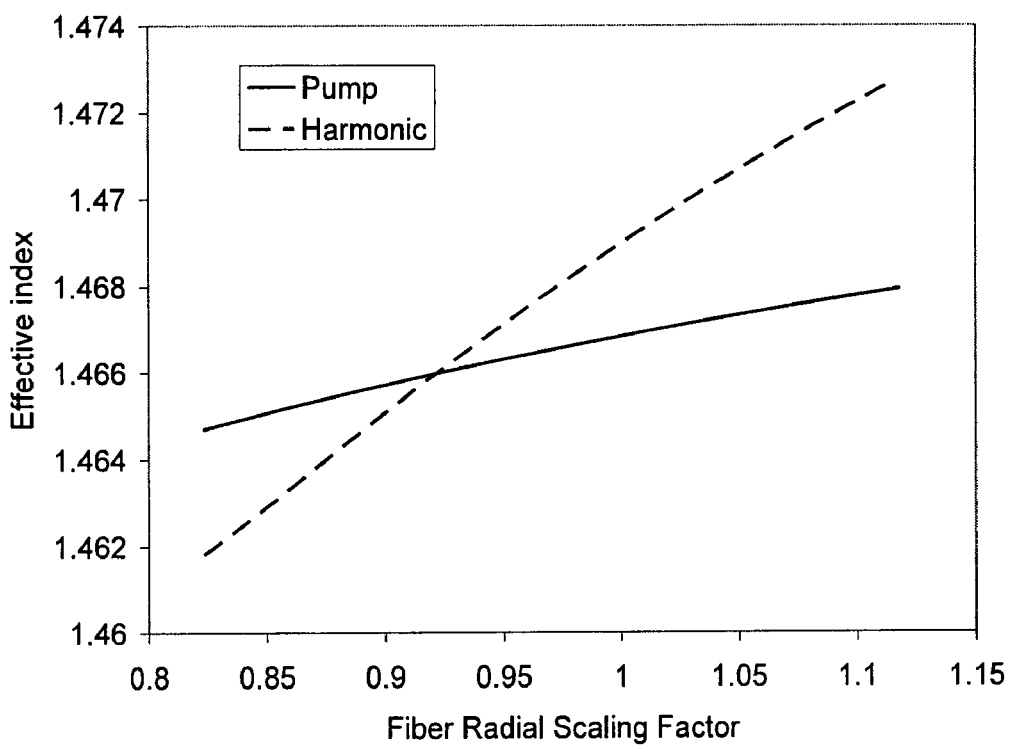
FIG. 10 is a plot of the Effective Index for the pump light and TH-generated light vs. Fiber Radial Scaling Factor.

FIG. 10 plots how the effective indices associated with optical fiber 10 change with fiber scaling factor for Example 1 (see Table 1). By drawing the optical fiber in a manner such that different sections (along the length of the fiber) have different diameters, a fiber section that meets the phase matching condition can be selected.

Figure 11:
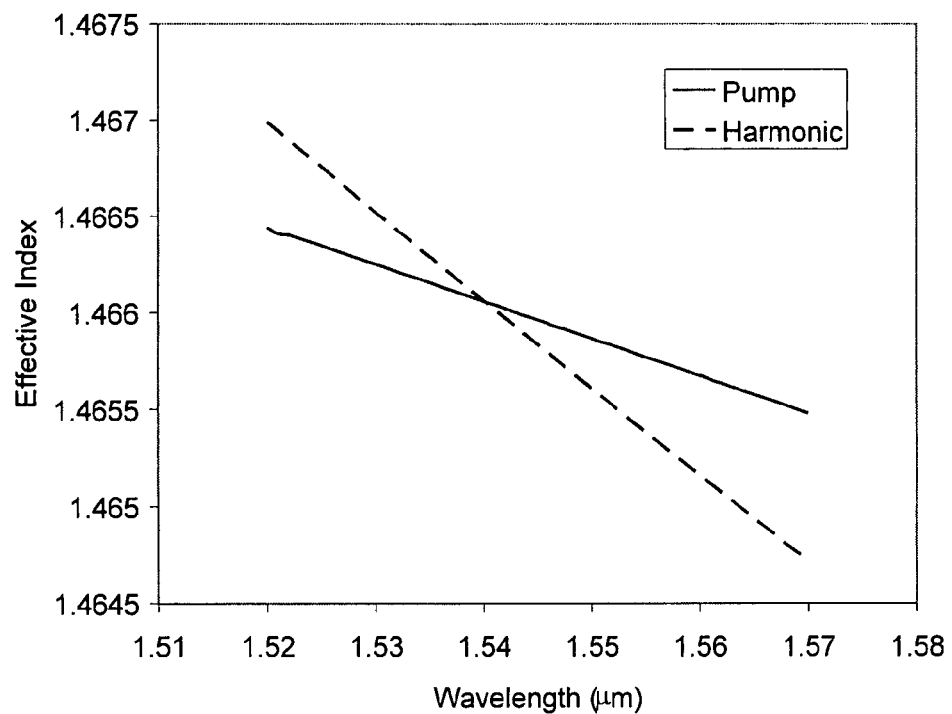
FIG. 11 is a plot of the Effective Index vs. Wavelength ($\mu$m) for the pump light and the TH-generated light.

Another way is to change the pump wavelength to tune the refractive indices. FIG. 11 plots the effective index associated with optical fiber 10 as a function of pump wavelength $\lambda_P$. Only the pump wavelength $\lambda_P$ is shown in FIG. 11, as the third-harmonic wavelength $\lambda_{TH}=\lambda_P/3$. FIG. 11 indicates that changing the pump wavelength $\lambda_P$ can be used to achieve proper phase matching and thus a greater conversion efficiency. A greater conversion efficiency translates into a greater amount of TH-generated light outputted by TH light source 100.

Theoretical Limits on Conversion Efficiency

The theoretically achievable power conversion efficiency is calculated below using a numerical model that considers pump depletion and fiber losses at both the signal and pump wavelengths. The model consists of the following four differential equations describing pump and harmonic powers $P_p$ and $P_s$ and their phase factors $\phi_p$ and $\phi_s$:

$$\frac{dP_s}{dz} = -\alpha_s P_s - 2C_{sppp}P_p^{3/2}P_s^{1/2}\sin\theta \quad (4)$$

$$\frac{d\phi_s(z)}{dz} = C_{ssss}P_s + 2C_{sspp}P_p + C_{sppp}P_p^{3/2}P_s^{-1/2}\cos\theta \quad (5)$$

$$\frac{dP_p}{dz} = -\alpha_p P_p + 2C_{ppps}P_p^{3/2}P_s^{1/2}\sin\theta \quad (6)$$

$$\frac{d\phi_p(z)}{dz} = C_{pppp}P_p + 2C_{ppss}P_s + C_{ppps}P_p^{1/2}P_s^{1/2}\cos\theta \quad (7)$$

where $\theta(z) = \Delta\beta z + [3\phi_p(z) - \phi_s(z)]$, $\Delta\beta = 3\beta_p - \beta_s$ and $$C_{ijkl} = \frac{2\pi}{\lambda_j}n_2 f_{ijkl} = \frac{\omega_j}{c}n_2 f_{ijkl},$$

where $f_{ijkl}$ are defined by equation (3), and where $\alpha_s$ and $\alpha_p$ are the fiber loss at the signal and pump wavelengths, respectively.

Examples 1, 12, 13 and 21 were selected for power conversion calculations, which are shown in Table 2, below.

TABLE 2

Maximum TH conversion efficiency and optimum fiber length

| Ex | $f_{ppps}$ | Max. TH conversion efficiency (%) | Optimum fiber length (m) |
|---|---|---|---|
| 1 | −0.034 | 41.3 | 48.3 |
| 12 | −0.044 | 56.5 | 49.2 |
| 13 | −0.023 | 31.6 | 55.1 |
| 21 | −0.050 | 57.7 | 46.3 |

For the calculations for f, the pump power $P_p$ used was 10 w, and the fiber attenuations $\alpha_s$ and $\alpha_p$ at both the pump and third-harmonic wavelengths were assumed to be 20 dB/km. Using the numerical model, the power evolution along the fiber for the pump and the harmonic beams can be calculated.

Figure 12:
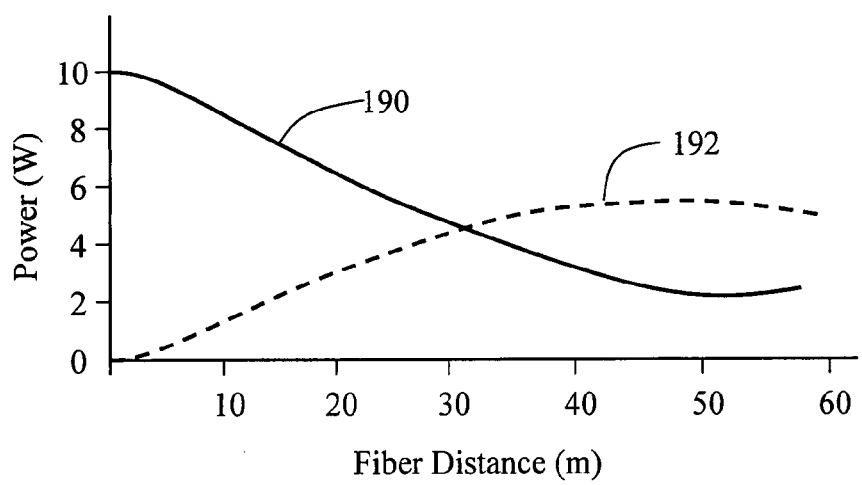
FIG. 12 plots the Power (W) vs. Distance (in meters) along the optical fiber for the calculated power changes for the pump light and the TH-generated light for an example optical fiber.

FIG. 12 plots the Power (W) vs. Distance (in meters) along the optical fiber for the calculated power changes for the pump light and the TH-generated light for Example 12. The pump power evolution is represented by curve 190 and the third-harmonic power evolution is represented by curve 192. From these power evolutions curves, the maximum conversion efficiency and its corresponding optimum fiber length are determined. The conversion efficiencies and optimum fiber lengths for the four examples considered in Table 2 are provided therein.

Figure 13:
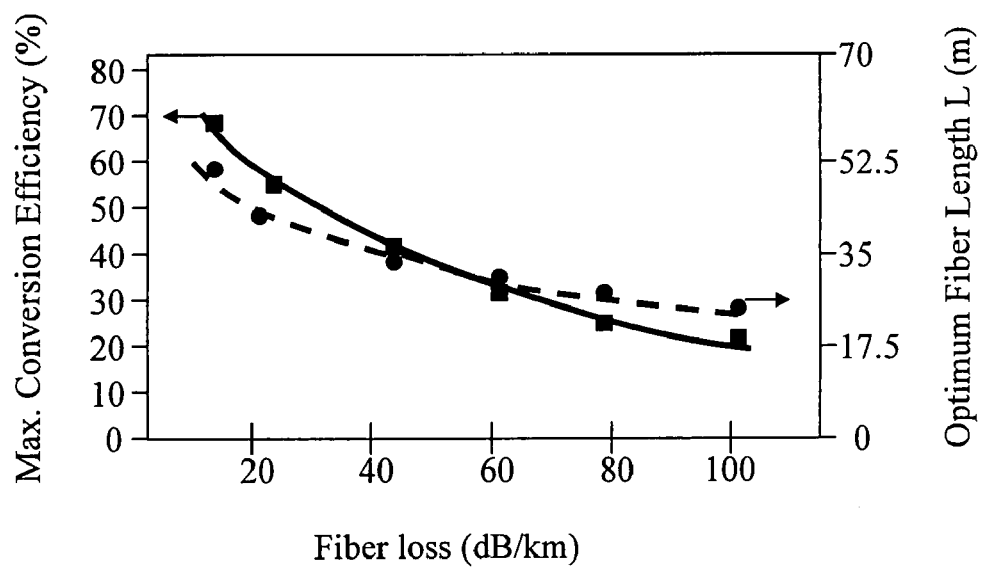
FIG. 13 is a plot of the Maximum Conversion Efficiency (%) (left-hand axis) and Optimum Fiber Length L (m)(right-hand axis) vs. Fiber Loss (dB/km) (horizontal axis)

Table 1 also indicates that the conversion efficiency increases with an increasing overlap integral $f_{sppp}$. Fiber attenuation also has a big impact on the conversion efficiency. FIG. 13 is a plot of the Maximum Conversion Efficiency (%) (left Y-axis) as a function of the optical fiber attenuation ("Fiber Loss" in dB/km) with a pump power of 10 W. The Optimum Fiber Length (L in m) is also plotted on the right Y-axis. The conversion efficiency (optimum fiber length) increases (decreases) with decreasing optical fiber loss, because reducing the fiber loss allows the pump and harmonic lights to interaction in the fiber over a longer distance. As shown in FIG. 13, if the optical fiber attenuation is 10 dB/km, a conversion efficiency up to 67% is theoretically possible with the present invention.

All the examples set forth above are for a pump light of wavelength $\lambda_P=1550$ nm and $\lambda_{TH}=(1550$ nm$)/3=516.6$ nm. However, the principles of the present invention can be applied to optical fibers for other pump wavelengths, for example $\lambda_P=1060$ nm and $\lambda_P=850$ nm to yield the corresponding TH-generated wavelengths.

Optical Transmission System Based on the TH Light Source

The TH light source of the present invention is well-suited for use in an optical transmission system. Such a system is made up of a transmitter of light signals, a receiver of light signals, and an optical transmission link that includes a length of waveguide fiber or fibers having respective ends optically coupled to the transmitter and receiver to propagate light signals therebetween. The length of the optical transmission link can be made up of a plurality of shorter-length links that are spliced or connected together in end to end series arrangement. The system can include additional optical components such as optical amplifiers, optical attenuators, optical isolators, optical switches, optical filters, or multiplexing or demultiplexing devices. One may denote a group of interconnected optical transmission systems as a telecommunications system.

In an example embodiment, the optical transmission link includes a span of optical fiber, or a plurality of optical fibers fused together serially, extending between optical devices, for example between two optical amplifiers, or between a multiplexing device and an optical amplifier. A span may comprise one or more sections of optical fiber as selected to achieve a desired system performance or parameter such as residual dispersion at the end of a span.

In an example embodiment, the optical transmission system operates at one or more wavelength bands, or operating wavelength ranges, or wavelength windows, that correspond to the wavelength of $\lambda_{TH}$ of TH-generated wavelength from light source 100.

Figure 14:
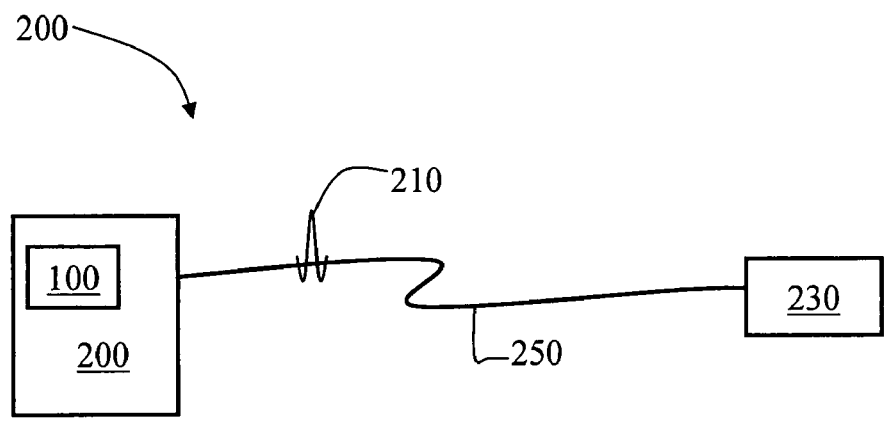
FIG. 14 is a schematic diagram of an optical transmission system that employs the TH light source of the present invention.

FIG. 14 is an example embodiment of an optical fiber transmission system 200 that uses TH light source 100 to generate optical signals 210 of wavelength $\lambda_{TH}$. System 200 includes a transmitter 220 that includes TH light source 100, and a receiver 230. An optical fiber link 250 that includes at least one optical fiber is optically coupled to the transmitter and the receiver at its respective ends. Optical fiber link allows transmission of optical signals 210 between transmitter 220 and receiver 230. System 200 is preferably capable of 2-way communication, and transmitter 220 and receiver 230 are shown for illustration only. System 200 may also include one or more optical devices optically connected to one or more sections or spans of optical fiber link 250, such as one or more regenerators, amplifiers, or dispersion compensating modules. In at least one preferred embodiment, an optical fiber communication system according to the present invention comprises a transmitter and receiver connected by an optical fiber link without the presence of a regenerator therebetween. In another preferred embodiment, an optical fiber communication system according to the present invention comprises a transmitter and receiver connected by an optical fiber link without the presence of an amplifier therebetween. In yet another preferred embodiment, an optical fiber communication system according to the present invention comprises a transmitter and receiver connected by an optical fiber link having neither an amplifier nor a regenerator nor a repeater therebetween.

Optical Processing System

Figure 15:
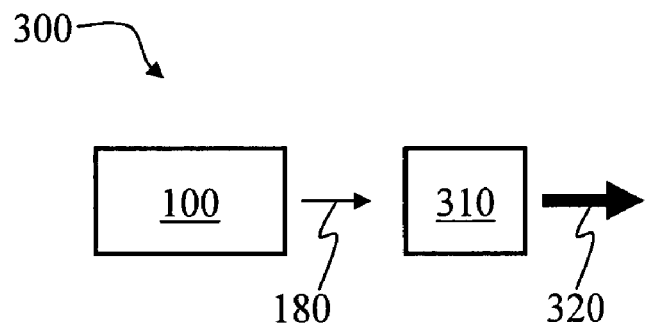
FIG. 15 is a schematic diagram of an optical processing system that employs at least one TH light source of the present invention.

FIG. 15 is a schematic diagram of an optical processing system 300 that includes at least on one light source 100 operably coupled to conditioning optics 310. TH-generated light 180 is provide to conditioning optics 310, which is adapted to condition the TH-generated light in a manner consistent with how the TH-generated light is to be used for a given application. Optical processing system 300 may be, for example, an optical transmitter, wherein conditioning optical system 310 is adapted to receive and modulate TH-generated light 180 for use an optical communication or optical data storage system. In other examples, optical processing system 300 is used for device inspection, laser projection displays, for medical applications, for material processing, or other such applications, and optical conditioning system 310 is adapted to receive TH-generated light 180 and form therefrom a conditioned light beam 320.

Figure 16:
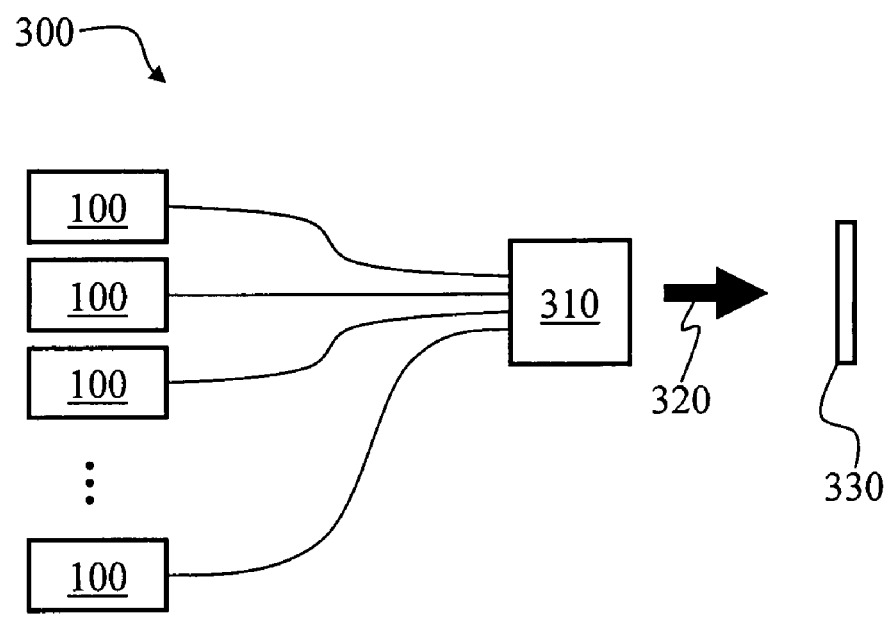
FIG. 16 is a schematic diagram similar to FIG. 15, illustrating an example embodiment of an optical processing system that employs a plurality of TH light sources and that is used to irradiate a workpiece.

FIG. 16 is an example embodiment of optical processing system 300 illustrating the use of a plurality of light sources 100 optically coupled to conditioning optical system 310 via respective optical fiber sections 130. Combining light sources 100 allows for relatively large amount of TH-generated light 180 to be available for use for a given application. In an example embodiment, conditioned light beam 320 is used to irradiate a workpiece 330 such as for materials processing or medical applications.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed is:

1. An optical-fiber-based light source that generates light via third-harmonic (TH) generation, comprising:
    a pump light source that provides pump light having a fundamental mode of wavelength $\lambda_P$;
    an optical fiber having an input end, an output end, a length L, and a core formed about a centerline and having a refractive index profile ($\Delta(\%)$), wherein the optical fiber is optically coupled to the pump light source at its input end;
    wherein the core refractive index profile has (i) a central region centered on the center line and having a refractive index value $\Delta_1$ and an outer radius $r_1$, (ii) a first annular region immediately surrounding the central region and having a refractive index value $\Delta_2$ and an inner and outer radii of $r_1$ and $r_2$, respectively, and (iii) a second annular region immediately surrounding the first annular region and having a refractive index value $\Delta_3$ and an inner and outer radii of $r_2$ and $r_3$, respectively;
    wherein $\Delta_2 < \Delta_1$ and $\Delta_2 < \Delta_3$, and wherein $\max\{\Delta_1, \Delta_3\} - \Delta_2 > 1.2\%$; and
    wherein the pump light produces the TH-generated light having a higher-order mode of wavelength $\lambda_{TH} = (1/3)\lambda_P$ and is outputted at the optical fiber output end, and wherein the pump light fundamental mode overlaps the TH-generated-light higher order mode over the length L so as to provide a conversion efficiency of pump light to TH-generated light of 1% or greater.

2. The optical fiber light source of claim 1, wherein the optical fiber satisfies the condition:

$$\max\{\Delta_1, \Delta_3\} - \Delta_2 > 1.5\%.$$

3. The optical fiber light source of claim 1, wherein the optical fiber satisfies the condition $\Delta_1, \Delta_3 > 1.5\%$.

4. The optical fiber light source of claim 1, wherein the optical fiber satisfies the condition $\Delta_1, \Delta_3 > 2.5\%$.

5. The optical fiber light source of claim 1, wherein the optical fiber satisfies the condition $0.5\ \mu m \leq r_1 \leq 1\ \mu m$.

6. The optical fiber light source of claim 1, wherein the optical fiber satisfies at least one of the following conditions: (a) $1.5 \leq r_2/r_1 \leq 3.5$ and (b) $2.5 \leq r_3/r_1 \leq 7$.

7. The optical fiber light source of claim 1, further including an optical filter arranged at or near the output end, the optical filter adapted to block the pump light and pass the TH-generated light.

8. The optical fiber light source of claim 1, further including:
    an optical tap arranged a point along the optical fiber and adapted to tap TH-generated light from the optical fiber;
    a tap optical fiber having first and second ends, with the first end optically coupled to the optical tap;
    a photodetector optically coupled to the output end of the tap optical fiber and adapted to detect TH-generated light and generated a detector signal representative of the detected TH-generated light; and
    a controller operably coupled to the photodetector and the pump light source and adapted to receive and process the detector signal and adjust an amount of pump light provided by the pump light source so as to control an amount of TH-generated light outputted by the optical fiber.

9. The optical fiber light source of claim 8, wherein the pump light source has a variable-wavelength output, and the controller is adapted to vary the wavelength $\lambda_P$ of the pump light source to optimize the conversion efficiency.

10. The optical fiber light source of claim 1, wherein the pump light source wavelength is one of: 1550 nm, 1060 nm and 850 nm.

11. A method of producing, with high conversion efficiency, third-harmonic generation light using an optical fiber, comprising:
    providing the optical fiber, wherein the optical fiber has an input end, an output end, a length L, and a core formed about a centerline and having a refractive index profile ($\Delta(\%)$), with (i) a central region centered on the center line and having a refractive index value $\Delta_1$ and an outer radius $r_1$, (ii) a first annular region immediately surrounding the central region and having a refractive index value $\Delta_2$ and an inner and outer radii of $r_1$ and $r_2$, respectively, and (iii) a second annular region immediately surrounding the first annular region and having a refractive index value $\Delta_3$ and an inner and outer radii of $r_2$ and $r_3$, respectively, and wherein $\Delta_2 < \Delta_1$ and $\Delta_2 < \Delta_3$, and wherein $\max\{\Delta_1, \Delta_3\} - \Delta_2 > 1.2\%$;

introducing pump light having a fundamental mode of wavelength of $\lambda_P$ into the optical fiber so as to produce TH-generated light having a higher-order mode of wavelength $\lambda_{TH} = (1/3)\lambda_P$ that is outputted at the optical fiber output end, including causing the pump light fundamental mode to overlap the TH-generated-light higher order mode over the length L to provide a conversion efficiency of pump light to TH-generated light of 1% or greater.

12. The method of claim 11, further including filtering unconverted pump light at or near the output end of the optical fiber so that only TH-generated light is outputted from the optical fiber.

13. The method of claim 11, further including:
detecting a portion of the TH-generated light so as to generate a detector signal representative of said detected portion; and
using the detector signal to control an amount of pump light so as to control an amount of TH-generated light outputted by the optical fiber.

14. The method of claim 11, including adjusting the pump light wavelength to control an amount of TH-generated light outputted by the optical fiber.

15. The method of claim 11, wherein providing the optical fiber includes ensuring the optical fiber satisfies at least one of the following properties:

(a) $\max\{\Delta_1, \Delta_3\} - \Delta_2 > 1.2\%$;
(b) $\max\{\Delta_1, \Delta_3\} - \Delta_2 > 1.5\%$;
(c) $\Delta_1, \Delta_3 > 1.5\%$;
(d) $\Delta_1, \Delta_3 > 2.5\%$;
(e) $0.5\ \mu m \leq r_1 \leq 1\ \mu m$;
(f) $1.5 \leq r_2/r_1 \leq 3.5$; and
(g) $2.5 \leq r_3/r_1 \leq 7$.

16. The method according to claim 15, wherein providing the optical fiber further includes ensuring the optical fiber satisfies the condition $1\ m < L < 60\ m$.

17. An optical transmission system comprising:
a transmitter that includes the optical fiber light source of claim 1;
a receiver adapted to receive optical signals formed from the TH-generated light;
an optical fiber link that connects the transmitter and receiver and that is adapted to carry said optical signals.

18. An optical processing system, comprising:
at least one light source of claim 1;
conditioning optics optically coupled to the at least one light source and adapted to condition the TH-generated light from the light source.

19. The optical processing system of claim 18, wherein the conditioning optics are adapted to form a light beam of TH-generated light from the at least one light source.

20. The optical processing system of claim 19, wherein the conditioning optics are adapted to modulate the TH-generated light form the at least one light source.

21. The optical processing system of claim 19, wherein the conditioning optics are optically coupled to the at least one light source using at least one optical fiber section.

* * * * *